United States Patent
Singer et al.

(10) Patent No.: US 7,533,491 B2
(45) Date of Patent: May 19, 2009

(54) GARDEN BED ASSEMBLY AND EXTENSIONS THEREFOR

(75) Inventors: Lisa R. Singer, Poway, CA (US); Steven A. Singer, Poway, CA (US)

(73) Assignee: Modular Merchants, Inc., San Diego, CA (US)

( * ) Notice: Subject to any disclaimer, the term of this patent is extended or adjusted under 35 U.S.C. 154(b) by 0 days.

(21) Appl. No.: 12/332,315

(22) Filed: Dec. 10, 2008

(65) Prior Publication Data

US 2009/0077881 A1 Mar. 26, 2009

Related U.S. Application Data

(63) Continuation-in-part of application No. 11/957,328, filed on Dec. 14, 2007, now Pat. No. 7,490,435, which is a continuation-in-part of application No. 11/073,072, filed on Mar. 4, 2005, now Pat. No. 7,424,787.

(60) Provisional application No. 61/078,313, filed on Jul. 3, 2008, provisional application No. 60/550,746, filed on Mar. 4, 2004.

(51) Int. Cl.
*A01G 9/02* (2006.01)

(52) U.S. Cl. .......................... 47/66.1; 47/65.5; 47/66.6; 47/33; 47/18; 47/19.1

(58) Field of Classification Search .................. 47/65.5, 47/66.1, 66.3, 79, 17, 18, 19.1, 66.6, 21.1, 47/33, 39, 65.9, 66.4, 73, 82, 83, 86, 68, 47/70, 66.2, 66.5; 52/102, 233, 36.1, 36.4, 52/36.5, 239, 653.1; 206/423, 509, 511, 206/503; 217/65; 256/25, 26; D11/143, D11/155, 152, 144
See application file for complete search history.

(56) References Cited

U.S. PATENT DOCUMENTS 3,935,671 A 2/1976 Soot
4,099,344 A 7/1978 Ruemeli (Continued)

*Primary Examiner*—T. Nguyen
(74) *Attorney, Agent, or Firm*—Bernard L. Kleinke; Duckor Spradling Metzger & Wynne

(57) ABSTRACT

A garden bed assembly and extensions therefor is disclosed. The garden bed assembly includes at least one raised garden starter module containing suitable planting soil or other growing media for plants and may be extended using one or more extender modules, such as straight extender modules and/or corner extender modules. The assembly as disclosed herein includes one or more modules defining the planter. The front section of the starter module and the straight extender module may include a rotatable upper portion to provide convenient access to the plants. Each module section may have a substantially imperforate lower portion and a perforate upper portion prohibiting unwanted creatures such as gophers, rabbits and other animals from gaining access to the growing plants in the garden bed assembly.

20 Claims, 3 Drawing Sheets

U.S. PATENT DOCUMENTS

| | | | |
|---|---|---|---|
| 4,753,036 A * | 6/1988 | Konno | 47/59 R |
| 4,869,018 A * | 9/1989 | Scales et al. | 47/33 |
| 4,897,955 A | 2/1990 | Winsor | |
| 5,168,678 A | 12/1992 | Scott, Jr. et al. | |
| 5,752,341 A * | 5/1998 | Goldfarb | 47/78 |
| 5,806,249 A * | 9/1998 | Helms | 52/102 |
| 6,681,522 B2 * | 1/2004 | Marchioro | 47/65.5 |
| 2007/0151150 A1 | 7/2007 | Sandoval | |

* cited by examiner

1

GARDEN BED ASSEMBLY AND EXTENSIONS THEREFOR

RELATED APPLICATION

This application is a continuation-in-part application to U.S. patent application Ser. No. 11/957,328, entitled GARDEN BED ENCLOSURE ASSEMBLY AND METHOD AND KIT THEREFOR, filed Dec. 14, 2007, which claims priority to U.S. patent application Ser. No. 11/073,072, entitled GARDEN BED ENCLOSURE ASSEMBLY AND METHOD AND KIT THEREFOR, filed Mar. 4, 2005, which is now U.S. Pat. No. 7,424,787 and claims priority to U.S. provisional patent application No. 60/550,746, entitled GARDEN BED ENCLOSURE ASSEMBLY AND METHOD AND KIT THEREFOR, filed Mar. 4, 2004. This application also claims priority to U.S. provisional patent application No. 61/078,313, entitled GARDEN BED ENCLOSURE ASSEMBLY AND METHOD AND KIT THEREFOR, filed Jul. 3, 2008. Each of these patent applications is incorporated herein by reference.

FIELD OF THE INVENTION

The present invention relates in general to a garden bed assembly and extensions therefor. It more particularly relates to a garden bed assembly and extensions useful for growing plants such as fruits and vegetables, in a backyard or other setting.

BACKGROUND ART

There is no admission that the background art disclosed in this section legally constitutes prior art.

Amateur gardeners have attempted to establish and grow fruits and vegetables in a backyard setting, and have met with varying degrees of success. There have been a variety of reasons for less than desirable results.

For example, soil conditions vary widely, and amateur gardeners may not have the time or knowledge to properly prepare the soil for suitable growing conditions. Other deterrents to successful gardening of comestible products relate to creatures such as gophers, rabbits, and other animals, who will eat otherwise healthy plants.

There have been various proposals for garden structures to facilitate backyard gardening. For example, reference may be made to the following U.S. patents and published application: 3,935,671; 4,099,344; 4,897,955; 5,168,678; and 2007/0151150.

The prior known garden enclosures include planter boxes with fences associated with them. However, none of the prior known planter boxes enable the user to enlarge the size of his or her garden by obtaining additional similar sized planter boxes, which are less expensive to manufacture as compared to the originally purchased units. Frequently, a gardener will desire to expand their gardens to increase the number of growing plants, and would like to do so at a cost savings as compared to their initial investment.

BRIEF DESCRIPTION OF THE DRAWINGS

The features of this invention and the manner of attaining them will become apparent, and the invention itself will be best understood by reference to the following description of certain embodiments of the invention taken in conjunction with the accompanying drawings, wherein.

DETAILED DESCRIPTION OF CERTAIN EMBODIMENTS OF THE INVENTION

Figure 1:
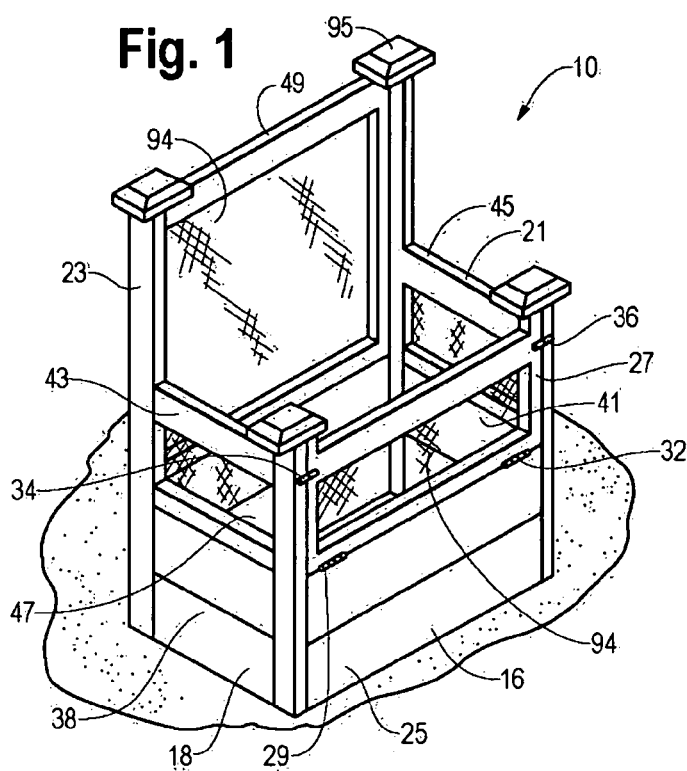
FIG. 1 is a pictorial view of a starter module of a garden bed assembly constructed according to an embodiment of the invention.
Figure 2:
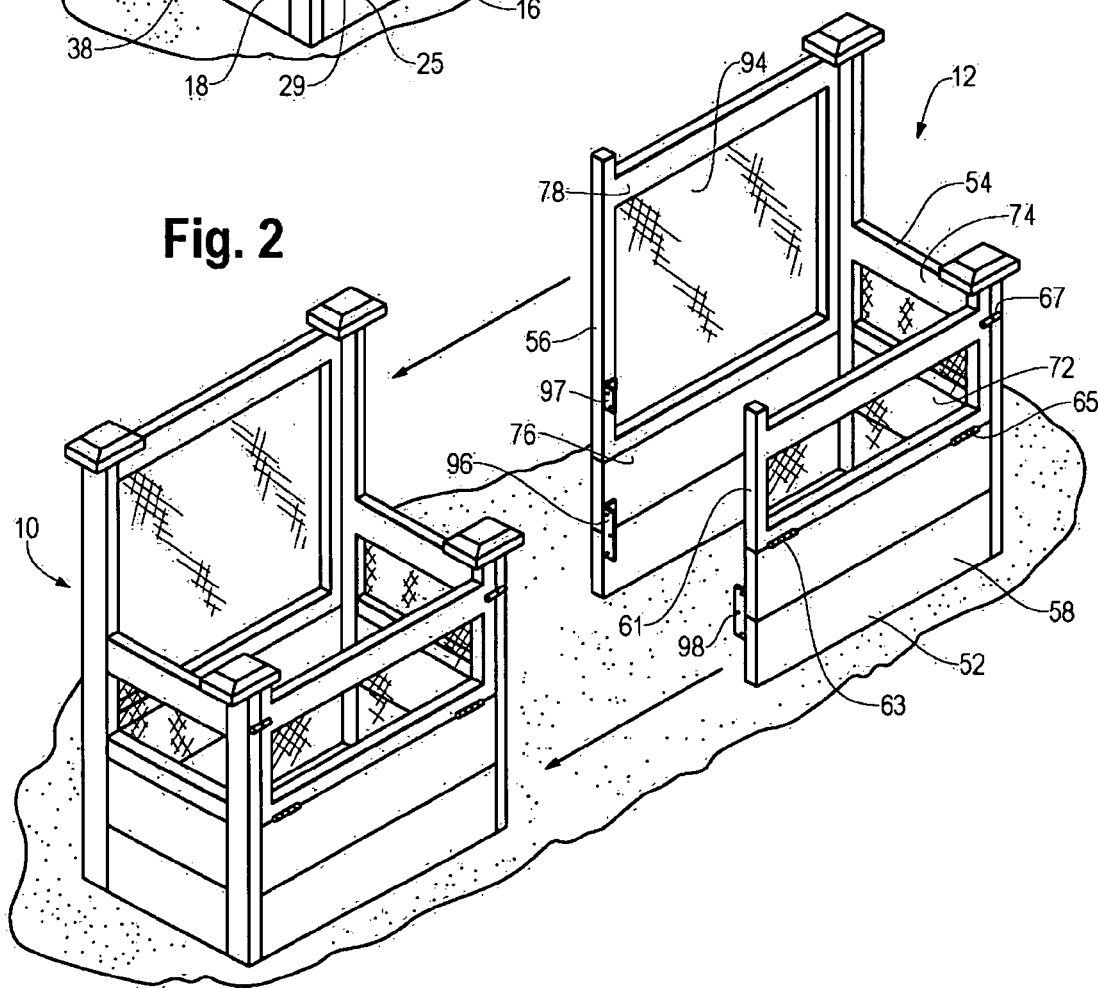
FIG. 2 is a pictorial view of a straight extender module illustrated in the process of being attached to the starter module of the assembly of FIG. 1.
Figure 3:
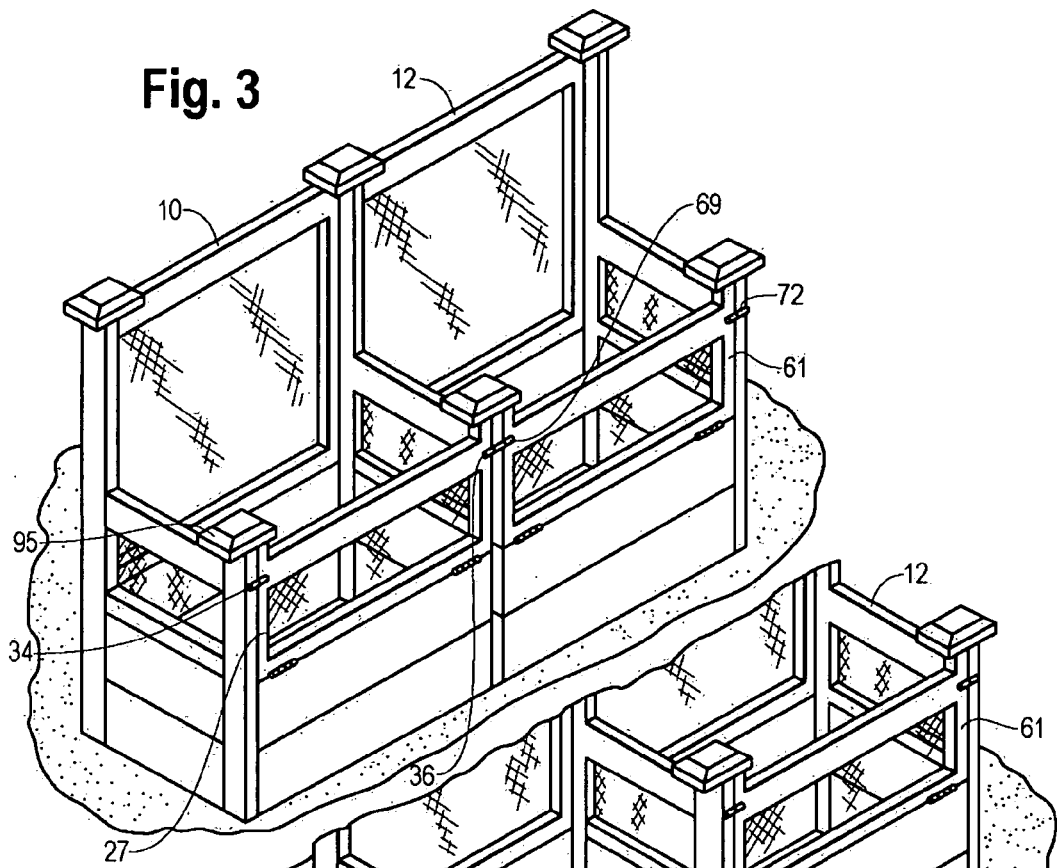
FIG. 3 is a pictorial view of the starter module of FIG. 1 and the straight extender of FIG. 2 after being attached together with their upper front portions raised.
Figure 4:
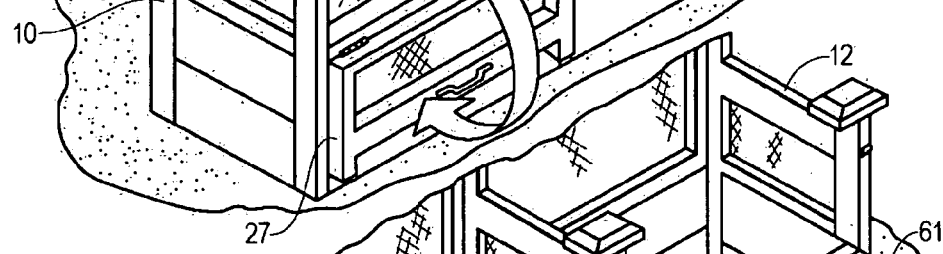
FIG. 4 is a pictorial view of the starter module of FIG. 1 and the straight extender of FIG. 2 after being attached together with the upper front portion of the starter module lowered and the upper front portion of the straight extender raised.
Figure 5:
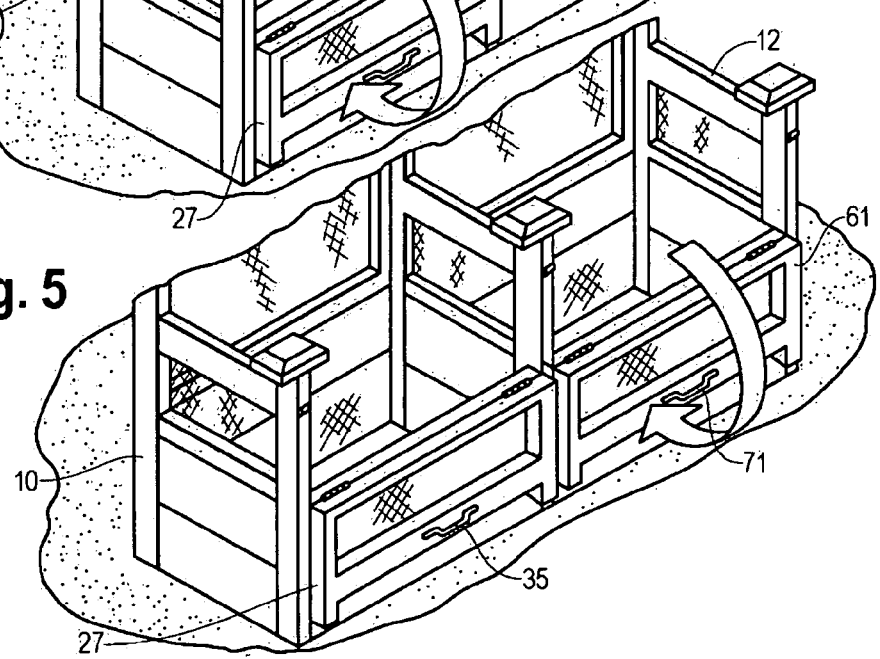
FIG. 5 a pictorial view of the starter module of FIG. 1 and the straight extender of FIG. 2 after being attached together with both of the upper front portions lowered.
Figure 6:
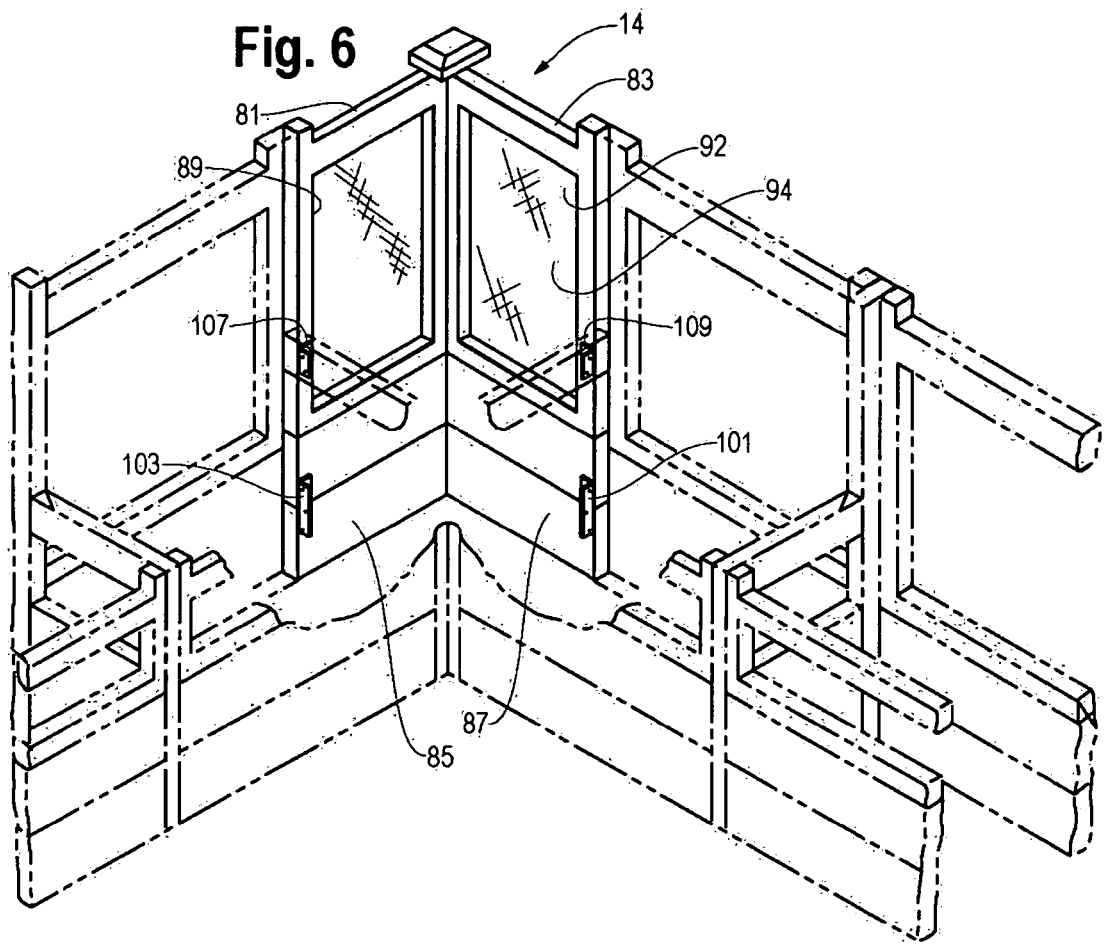
FIG. 6 is a pictorial view of a corner extender module for attaching to a pair of starter modules of FIG. 1 in an L-shaped configuration.

There is disclosed a garden bed assembly and extensions therefor. The garden bed assembly includes at least one raised garden starter module containing suitable planting soil or other growing media for plants and may be extended using one or more extender modules, such as straight or elongated extender modules and/or corner extender modules. The assembly as disclosed herein includes one or more modules defining the planter. The front section of the starter module and the straight extender module may include a rotatable upper portion to provide convenient access to the plants. Each module section may have a substantially imperforate lower portion and a perforate upper portion prohibiting unwanted creatures such as gophers, rabbits and other animals from gaining access to the growing plants in the garden bed assembly.

The straight extender module may be constructed in a similar manner to the starter module, but may be less expensive to manufacture and may be of substantially the same size as the starter module to increase effectively the planting area. The extender module is less expensive to manufacture since it may share a common section or wall with the starter module.

In accordance with certain embodiments of the present invention, there is provided a garden bed assembly for holding planting media for growing plants. The assembly may comprise a starter module, an extender module, such as a straight or elongated extender module, and connectors for fixing the extender module to the starter module. The starter module may include a front section, a pair of side sections, and a rear section. The straight extender module may include a front section, a side section and a rear section. The front section of the starter module may include a substantially imperforate lower portion and a perforated upper portion, and means, such, for example, as at least one hinge, for movably connecting the perforated upper portion of the front section of the starter module to the lower portion of the front section of the starter module for enabling the upper portion of the front section of the starter module to move between an upright closed position and a lowered open position to provide access to the planting media and plants. The pair of side sections of the starter module may each be attached at a first end to the front section of the starter module, and each side section of the starter module may include a substantially imperforate lower portion and a perforated upper portion. The rear section of the starter module may include a substantially imperforate lower portion and a perforated upper portion, and may be attached at its ends to second ends of each of the pair of side sections of the starter module. Each of the lower portions of the sections may be substantially the same height and connected together to form an enclosure for the planting media. The upper portions of the sections may be connected together to help prevent pests from accessing the planting media and plants. The upper portions of the front and side sections may be substantially the same height. The straight extender module may be adapted to attach to the starter module for effectively, substantially increasing the planting area provided by the starter module. The extender module may be similar to the starter module and have front and rear sections and a single side section forming a generally U-shaped configuration. The connectors fix the extender module to one of the side sections of the starter module to share a common section therewith.

According to another a disclosed embodiment of the invention, there is provided a straight extender module for a starter module to add additional area for holding planting media for growing plants. The starter module may include a front section, a side section, and a rear section connected together rigidly and arranged in an upright U-shaped configuration and a pair of connectors for attaching ends of the front and rear sections to the starter module. The front section may include a substantially imperforate lower portion and a perforated upper portion and means, such, for example, as at least one hinge, for movably connecting the perforated upper portion of the front section to the lower portion of the front section for enabling the upper portion of the front section to move between an upright closed position and a lowered open position to provide access to the planting media and plants. The side section may include a substantially imperforate lower portion and a perforated upper portion. The rear section may include a substantially imperforate lower portion and a perforated upper portion. Each of the lower portions of the sections may be substantially the same height and connected together to form with the starter module an extended rectangular enclosure for the planting media. The upper portions of the sections being connected together to help prevent pests from accessing the planting media and plants. The height of upper portions of the front and side sections being substantially the same.

According to yet another disclosed embodiment of the invention, there is provided a garden bed assembly for holding planting media for growing plants. The assembly may comprise a starter module including a front section, a pair of side sections, and a rear section. The front section may include a substantially imperforate lower portion and a perforated upper portion, and means, such, for example, as at least one hinge, for movably connecting the perforated upper portion of the front section to the lower portion of the front section for enabling the upper portion of the front section to move between an upright closed position and a lowered open position to provide access to the planting media and plants. The pair of side sections may each be attached at a first end to the front section, and each side section may include a substantially imperforate lower portion and a perforated upper portion. The rear section may include a substantially imperforate lower portion and a perforated upper portion, and may be attached at its ends to second ends of each of the pair of side sections. Each of the lower portions of the sections may be substantially the same height and connected together to form an enclosure for the planting media. The upper portions of the sections may be connected together to help prevent pests from accessing the planting media and plants. The upper portions of the front and side sections may be substantially the same height. The height of the upper portion of the rear section may be greater than the height of the upper portions of the front and side sections to allow the upper portion of the rear section to serve as a trellis.

Referring now to FIGS. 1 through 7 of the drawings, there are shown modules constructed in accordance the present invention for constructing a garden bed assembly. The modules may include a starter module 10, a straight extender module 12, and a corner extender module 14 to construct straight or L-shaped garden bed assemblies as shown. It should be understood by those skilled in the art that other arrangements of the modules, and the number and types of modules boxes, may vary to construct garden bed assemblies of other shapes, such as U-shaped for example. The sizes of the modules may vary as will become apparent to those skilled in the art.

The starter module 10 may include a front section 16, a pair of side sections 18 and 21, and a rear section 23 configured generally in a rectangular shape. The starter module 10 may be open at its top and may contain soil or growing media for growing plants.

The front section 16 may include a substantially imperforate lower portion 25 and a perforated upper portion 27. The upper portion 27 may be movably connected to the lower portion 25 by moveable connecting means, such, for example, as a pair of hinges 29, 32, a piano hinge (not shown), or some other suitable connector, to allow the upper portion 27 to rotate from an upright closed position to a downward open position. A pair of latches 34, 36 may be attached on opposition upper sides of the upper portion 27 and the corresponding side section 18 and 21, respectively, to releasably secure the upper portion 27 in its upright closed position. A handle 35 may be disposed on the inside of the upper portion 27 to facilitate the raising and lowering of the upper portion 27.

Each side section 18, 21 may include a substantially imperforate lower portion 38 and 41, respectively, and a perforated upper portion 43 and 45, respectively. The height of the lower portions 38, 41 of the side portions 18, 21 may be substantially the same as the height of the lower portion 25 of the front section 16. Likewise the height of the upper portions 43, 45 of the side portions 18, 21 may be substantially the same as the height of the upper portion 27 of the front section 16.

The rear section 23 may include a substantially imperforate lower portion 47 and a perforated upper portion 49 The height of the lower portion 47 of the rear portion 23 may be substantially the same as the height of the lower portions 25, 38, 41 of the front section 16 and side sections 18, 21, respectively. The height of the upper portion 49 of the rear section 23 may be substantially the same as or significantly greater than the height of the upper portions 27, 43, 45 of the front section 16 and side sections 18, 21, respectively. The upper portion 49 of the rear section 23 may be used as a trellis if the height of the upper portion 49 is significantly greater than the height of the other upper portions 27, 43, 45.

The straight extender module 12 may include a front section 52, a side section 54, and a rear section 56 configured generally in a U-shape and adapted to be connected to a starter module to create an extension configured generally in a rectangular shape. The extension created by the straight extender module 12 and the starter module may be open at its top and may contain soil or growing media for growing plants.

The front section 52 may include a substantially imperforate lower portion 58 and a perforated upper portion 61. The upper portion 61 may be movably connected to the lower portion 58 by a pair of hinges 63, 65, a piano hinge (not shown), or some other suitable connector to allow the upper portion 61 to rotate from an upright closed position to a downward open position. A pair of latches 67, 69 may be attached on opposition upper sides of the upper portion 61 and the side section 54 and the corresponding side section of the starter module, respectively, to releasably secure the upper portion 61 in its upright closed position. A handle 71 may be disposed on the inside of the upper portion 61 to facilitate the raising and lowering of the upper portion 61. A fastener such as an elongated L-bracket 98 may be attached to an end of the lower portion 66 for attaching to the lower portion of a side section of the starter module 10. While L-brackets are disclosed herein for connecting modules together, other fasteners such as screws, nails and others may also be employed.

The side section 54 may include a substantially imperforate lower portion 72 and a perforated upper portion 74. The length of the side section 54 may be substantially the same as the length of each of the side sections 18, 21 of the starter module 10. The height of the lower portion 72 of the side portion 54 may be substantially the same as the height of the lower portion 58 of the front section 52 and the lower portions 25, 38, 41, 47 of the starter module 10. Likewise the height of the upper portion 74 of the side section 54 may be substantially the same as the height of the upper portion 61 of the front section 52 and the upper portions 27, 43, 45 of the starter module 10.

The rear section 56 may include a substantially imperforate lower portion 76 and a perforated upper portion 78. The height of the lower portion 76 of the rear portion 56 may be substantially the same as the height of the lower portions 58, 72 of the front section 52 and side section 54, respectively. The height of the upper portion 49 of the rear section 23 may be substantially the same as or significantly greater than the height of the upper portions 61, 74 of the front section 52 and side section 54, respectively. The upper portion 78 of the rear section 56 may be used as a trellis if the height of the upper portion 78 is significantly greater than the height of the other upper portions 61, 74. The upper portion 78 of the rear section 56 of the straight extender module 12 may be substantially the same as the height of the upper portion 48 of the rear section 23 of the starter module 10. An elongated L-bracket 96 may be attached to an end of the lower portion 76 for attaching to the lower portion of a side section of the starter module 10. Likewise, an L-bracket 97 may be attached to an end of the upper portion 74 for attaching to the upper portion of the side section of the starter module 10.

The corner extender module 14 may include a pair of rear sections 81 and 83 configured generally in an L-shape and adapted to be connected to a pair of starter modules to create a corner configured generally as a square. The corner created by the corner extender module 14 and the two starter modules may be open at its top and may contain soil or growing media for growing plants.

Each rear section 81, 83 may include a substantially imperforate lower portion 85 and 87, respectively, and a perforated upper portion 89 and 92, respectively. The length of each of the rear sections 81, 83 may be substantially the same as the length of each of the side sections 18, 21 of the starter module 10. The height of the lower portions 85, 87 of the rear portions 81, 83 may be substantially the same as the height of the lower portions 25, 38, 41, 47 of the starter module 10. Likewise the height of the upper portions 89, 92 of the rear portions 81, 83 may be substantially the same as the height of the upper portion 48 of the rear section 23 of the starter module 10. The upper portions 89, 92 of the rear sections 81, 83 may be used as a trellis.

A pair of elongated L-brackets 101, 103 may be attached to opposing ends of the lower portions 85, 87 of the rear portions 81, 83 for attaching to the lower portions of the side sections of the two starter modules. A pair of L-brackets 107, 109 may be attached to opposing ends of the upper portions 89, 92 of the rear portions 81, 83 for attaching to the upper portions of the side sections of the two starter modules.

The modules of the garden bed assembly may be generally constructed from natural lumber or other construction material, such as plastic lumber for example. Poultry wire, hardware cloth, or other open mesh fabric 94 may be fastened by suitable means (not shown) such as staples or framing to the backside of each of the upper portions of the modules to permit sunlight as well as pollinating bees to enter the enclosure while prohibiting unwanted creatures from gaining access thereto. Likewise, the floor of the modules may be in the form of a mesh material such as poultry wire or hardware cloth (not shown), to prevent, or at least retard, the entrance into the assembly by unwanted pests such as gophers. On the other hand, plastic tubs having perforated bottoms (not shown) substantially the same size as the enclosures made by the modules may be utilized to hold the planting media, eliminating the need of the mesh floor material.

As shown in the figures, each upper portion of the front section of the modules may be independently raised or lowered.

It is to be understood that a tall section may be included as one or more of the sections of each module, or all of the sections can be the same height, if desired. The height of the sections may all be substantially the same, and may vary in size, such as between about two feet and about six feet. Furthermore, the height of the lower portions of the modules may all be substantially the same, and may vary in size, such as between about six inches and about two feet.

A cap block 95 may be attached to each of the posts used to form the upper portions of the modules. The cap block may be provided for decorative purposes only to provide an aesthetically pleasing appearance.

Figure 7:
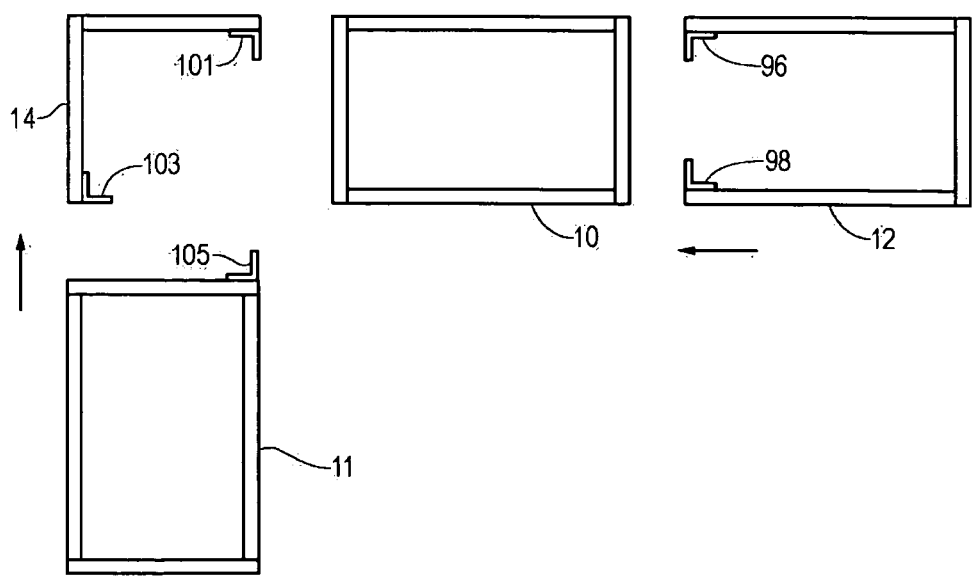
FIG. 7 is a diagrammatic plan view of an unassembled garden bed assembly utilizing a pair of starter modules, a straight extender module, and a corner extender module to allow construction of an L-shaped garden bed assembly.

As shown in FIG. 7, a plurality of elongated L-brackets or other suitable fasteners may be used to attach the lower portions of the modules to one another. The front and rear sections of the straight extender module 12 may be attached to a side section of the starter module 10 using elongated L-brackets 96 and 98. Likewise, the rear sections of the corner extender module 14 may be attached to side sections of the starter modules 10, 11 using elongated L-brackets 101 and 103. A third elongated L-bracket 105 may be utilized to connect the corresponding edges of the side sections of the starter modules 10, 11. The starter module 11 may be substantially identical to the starter module 10.

An irrigation system (not shown) may be provided to supply water to the plants to facilitate their growth. The irrigation system may include a timer and a garden hose spigot. The timer may control the supply of water to the plants in the modules of the assembly. The spigot may enable the user to connect a conventional garden hose (not shown) for additional manual watering of the plants. One or more tool holders (not shown), such as a tool holder or hook, may be attached to one or more of the modules of the garden bed assembly for conveniently holding garden tools (not shown) for use by the gardener.

According to at least some of the embodiments of the invention, the garden bed assemblies constructed from the modules and are sufficiently narrow to permit a person to reach the plants growing in the assembly in a convenient manner. Additionally, the growing plants can use the open mesh material on all of the adjacent vertical walls as trellises.

The versatility of the modules of the invention allow for the construction of a garden bed for almost any desired location allowing anyone to have their own garden in a convenient location. Additionally, the size of modules, the rotatable front upper portion, and the raised beds make the garden beds constructed from these modules easily accessible for the gardener, thus providing a convenient and enjoyable gardening experience.

It should be understood that the words "about" and "approximately" as used herein means a tolerance of plus or minus 20 percent.

While particular embodiments of the present invention have been disclosed, it is to be understood that various different modifications are passing and one contemplated within the true spirit and scope of the appended claims. For example, planter box walls could be composed of a variety of materials, such as wood, plastic, metal and other. There is no intention, therefore, of limitations to the exact abstract or disclosure herein presented.

What is claimed is:

1. A garden bed assembly for holding planting media for growing plants, comprising:
   a starter module including a front section, a pair of side sections, and a rear section;
   the front section of the starter module including a substantially imperforate lower portion and a perforated upper portion;
   means for movably connecting the perforated upper portion of the front section of the starter module to the imperforate lower portion of the front section of the starter module for enabling the upper portion of the front section of the starter module to move between an upright closed position and a lowered open position to provide access to the planting media and plants;
   the pair of side sections of the starter module each attached at a first end to the front section, each side section of the starter module including a substantially imperforate lower portion and a perforated upper portion;
   the rear section of the starter module including a substantially imperforate lower portion and a perforated upper portion, the rear section of the starter module attached at its ends to second ends of each of the pair of side sections of the starter module;
   each of the lower portions of the sections of the starter module being substantially the same height and connected together to form an enclosure for the planting media;
   the upper portions of the sections of the starter module being connected together to help prevent pests from accessing the planting media and plants;
   the upper portions of the front and side sections of the starter module being substantially the same height;
   a straight extender module adapted to be attached to the starter module for effectively, substantially increasing the planting area provided by the starter module;
   the extender module being similar to the starter module and having front and rear sections and a single side section forming a generally U-shaped configuration; and
   connectors for fixing the extender module to one of the side sections of the starter module to share a common section therewith.

2. The garden bed assembly according to claim 1, wherein the height of the upper portion of the rear sections of the modules being greater than the height of the upper portions of the front and side sections of the modules to allow the upper portions of the rear sections of the modules to serve as a trellis.

3. The garden bed assembly according to claim 1, wherein the front section of the extender module including a substantially imperforate lower portion and a perforated upper portion, and means for movably connecting the perforated upper portion of the front section of the extender module to the lower portion of the front section of the extender module for enabling the upper portion of the front section of the extender module to move between an upright closed position and a lowered open position to provide access to the planting media and plants.

4. The garden bed assembly according to claim 3, further including a pair of latches to hold the upper portion of the front section of each module in its upright closed position.

5. The garden bed assembly according to claim 3, wherein the movably connecting means of each module includes a pair of hinges.

6. The garden bed assembly according to claim 1, further including a corner extender module adapted to attach to one of the side sections of the starter module and to a side section of another module in an L-shaped configuration.

7. The garden bed assembly according to claim 1, wherein the height of the lower portions of the sections is between about six inches and about two feet.

8. The garden bed assembly according to claim 1, wherein the height of the lower portions of the sections is about one foot.

9. The garden bed assembly according to claim 1, wherein the height of the side and front sections is between about two feet and about three feet.

10. The garden bed assembly according to claim 1, wherein the height of the rear section is between about four feet and about six feet.

11. A straight extender module for a garden bed assembly to add additional area for holding planting media for growing plants, the garden bed assembly having a starter module with front and rear sections and a pair of side sections, comprising:
    a front section, a side section, and a rear section connected together rigidly and arranged in an upright U-shaped configuration;
    a pair of connectors for attaching ends of the front and rear sections to the starter module;
    the front section including a substantially imperforate lower portion and a perforated upper portion;
    means for movably connecting the perforated upper portion of the front section to the imperforate lower portion of the front section for enabling the upper portion of the front section to move between an upright closed position and a lowered open position to provide access to the planting media and plants;
    the side section including a substantially imperforate lower portion and a perforated upper portion;
    the rear section including a substantially imperforate lower portion and a perforated upper portion;
    each of the lower portions of the sections being substantially the same height and connected together to form with the starter module an extended rectangular enclosure for the planting media;
    the upper portions of the sections being connected together to help prevent pests from accessing the planting media and plants;
    the height of upper portions of the front and side sections being substantially the same; and connectors for fixing the straight extender module to one of the side sections of the starter module to share a common section therewith.

12. The straight extender module according to claim 11, wherein the height of the upper portion of the rear section being greater than the height of the upper portions of the front and side sections to allow the upper portion of the rear section to serve as a trellis.

13. The straight extender module according to claim 11, wherein the height of the front and side sections of the extender module are substantially the same as the height of the front and side sections of the starter module.

14. The straight extender module according to claim 11, wherein the height of the rear section of the extender module is substantially the same as the height of the rear section of the starter module.

15. The straight extender module according to claim 11, further including a corner extender module adapted to attach to the extender module and to another module in an L-shaped configuration.

16. A garden bed assembly for holding planting media for growing plants, comprising:

a starter module including a front section, a pair of side sections, and a rear section;

the front section including a substantially imperforate lower portion and a perforated upper portion;

means for movably connecting the perforated upper portion of the front section to the imperforate lower portion of the front section for enabling the upper portion of the front section to move between an upright closed position and a lowered open position to provide access to the planting media and plants;

the pair of side sections each attached at a first end to the front section, each side section including a substantially imperforate lower portion and a perforated upper portion;

the rear section including a substantially imperforate lower portion and a perforated upper portion, the rear section attached at its ends to second ends of each of the pair of side sections;

each of the lower portions of the sections being substantially the same height and connected together to form an enclosure for the planting media;

the upper portions of the sections being connected together to help prevent pests from accessing the planting media and plants;

the upper portions of the front and side sections being substantially the same height; and the height of the upper portion of the rear section being greater than the height of the upper portions of the front and side sections to allow the upper portion of the rear section to serve as a trellis.

17. The garden bed assembly according to claim 1, further including a pair of latches to hold the upper portion of the front panel in its upright closed position.

18. The garden bed assembly according to claim 1, wherein the movably connecting means includes a pair of hinges.

19. The garden bed assembly according to claim 1, further including a straight extender module adapted to attach to one of the side sections of the starter module.

20. The garden bed assembly according to claim 1, further including a corner extender module adapted to attach to one of the side sections of the starter module and to a side section of another module in an L-shaped configuration.

* * * * *